United States Patent
Blemberg et al.

(10) Patent No.: US 7,384,679 B2
(45) Date of Patent: Jun. 10, 2008

(54) ENCAPSULATED BARRIER FOR FLEXIBLE FILMS AND A METHOD OF MAKING AND USING THE SAME

(75) Inventors: Robert J. Blemberg, Appleton, WI (US); Kevin J. Curie, Appleton, WI (US); Eric Cudnohoske, Oshkosh, WI (US)

(73) Assignee: Pechiney Emballage Flexible Europe, Rueil-Malmaison Cedex (FR)

( * ) Notice: Subject to any disclaimer, the term of this patent is extended or adjusted under 35 U.S.C. 154(b) by 379 days.

(21) Appl. No.: 10/918,958

(22) Filed: Aug. 16, 2004

(65) Prior Publication Data

US 2005/0069719 A1 Mar. 31, 2005

Related U.S. Application Data (63) Continuation-in-part of application No. 10/325,002, filed on Dec. 20, 2002, now Pat. No. 6,911,244, which is a continuation of application No. 09/650,385, filed on Aug. 29, 2000, now Pat. No. 6,500,514.

(51) Int. Cl.
  B32B 1/04 (2006.01)
  B32B 3/04 (2006.01)
  B32B 27/32 (2006.01)
(52) U.S. Cl. .................. 428/74; 428/475.8; 428/474.9; 428/520; 428/522; 264/171.11
(58) Field of Classification Search .................. 428/76, 428/475.8, 474.9, 520, 522; 264/171.11; 53/476; 426/412
See application file for complete search history.

(56) References Cited

U.S. PATENT DOCUMENTS

| | | | |
|---|---|---|---|
| 4,261,473 A * | 4/1981 | Yamada et al. ............. 215/379 |
| 4,307,197 A | 12/1981 | Daniel et al. | |
| 4,526,821 A | 7/1985 | McHenry et al. | |
| 4,557,780 A * | 12/1985 | Newsome et al. ..... 156/244.11 |
| 4,818,592 A | 4/1989 | Ossian | |
| 4,909,726 A | 3/1990 | Bekele | |
| 5,061,534 A | 10/1991 | Blemberg et al. | |
| 5,106,562 A | 4/1992 | Blemberg et al. | |
| 5,154,789 A | 10/1992 | Ossian | |
| 5,190,711 A | 3/1993 | Blemberg | |
| 5,236,642 A | 8/1993 | Blemberg et al. | |
| 5,374,459 A | 12/1994 | Mumpower et al. | |
| 5,753,363 A * | 5/1998 | Bader et al. ................. 428/331 |
| 6,500,514 B1 | 12/2002 | Blemberg et al. | |
| 2003/0087057 A1* | 5/2003 | Blemberg et al. ............. 428/76 |
| 2003/0099851 A1* | 5/2003 | Mount et al. ............ 428/476.1 |
| 2005/0069719 A1* | 3/2005 | Blemberg et al. ........ 428/474.4 |

FOREIGN PATENT DOCUMENTS

| | | |
|---|---|---|
| EP | 268 695 | * 11/1986 |
| EP | 0 323 043 | 7/1989 |
| EP | 0 473 823 | 3/1992 |
| WO | WO 02/18139 A1 | 3/2002 |

OTHER PUBLICATIONS

Ceramis® Barrier films, Alcan Packaging Brochure, undated.*

* cited by examiner

*Primary Examiner*—Sheeba Ahmed (57) ABSTRACT

A film structure having an inner barrier layer comprised of a blend of a polyamide and ethylene vinyl alcohol copolymer. The polyamide is present in the blend in an amount of from 15-40%, and most preferably from 25-30%. The inner barrier layer is laminated on each side with a layer of a polyamide. The preferred polyamide is nylon, and particularly nylon 6. In a preferred embodiment, the film structure is layered with an oxide or ceramic layer. Included is a method of manufacturing the film and for using the film structure to package a product in a retort packaging process.

68 Claims, 4 Drawing Sheets

ENCAPSULATED BARRIER FOR FLEXIBLE FILMS AND A METHOD OF MAKING AND USING THE SAME

This application is a continuation-in-part application of Application Ser. No. 10/325,002 filed Dec. 20, 2002 now U.S. Pat. No. 6,911,244 entitled Encapsulated Barrier for Flexible Films and a Method of Making the Same, which is a continuation Ser. No. 09/650,385 filed Aug. 29, 2000, now U.S. Pat. No. 6,500,514.

FIELD OF THE INVENTION

The present invention relates to packaging films, and more specifically to encapsulated barrier film structures and methods of making and using the same.

BACKGROUND TO THE INVENTION

It is, of course, generally known to utilize a polymeric material as a barrier material in films to prevent the passage of molecules such as, for example, gases and water vapor. Films may have these barrier properties to protect foods or other gas-sensitive materials that may be contained within bags or other containers made from the films. In particular, food articles are subject to the deleterious effects of gases and water vapors.

A known film structure that prevents the passage of molecules therethrough uses polyvinylidene chloride ("PVdC") or polyvinylidene chloride/methyl acrylate copolymer ("PVdC/MA"), commonly known as MA-Saran and manufactured by Dow Chemical Company. These barriers are generally useful in preventing molecules such as oxygen from passing therethrough but are fairly unstable at the high temperatures needed to produce many multilayer films from a molten resin. Typically, PVdC degrades at high temperatures forming polyenes reducing the optical clarity of films made therefrom. A suitable, albeit more costly, substitute for MA-Saran is ethylene vinyl alcohol copolymer ("EVOH").

Another film that is commonly used as a barrier layer, especially for food products such as cheese, is a PVdC coated oriented polypropylene ("OPP") layer. Structures made using this barrier material have good barrier characteristics. Specifically, barrier layers of PVdC coated OPP adequately restrict the movement of oxygen molecules or water vapor through packaging made therefrom. However, PVdC coated OPP is cost prohibitive.

Generally, EVOH is thermally stable at higher temperatures relative to PVdC or MA-Saran. However, EVOH is still sensitive to high temperatures, particularly when adhered to a layer of polyethylene ("PE") having maleic anhydride functional groups. While EVOH may be extruded at higher temperatures relative to PVdC, the temperature of extrusion may still be too low for coextrusion with other layers that require very high temperatures for adequate melting and/or adhesion to lamination or coating substrates.

Typical methods of coextrusion generally entail feeding the barrier material and adhesive resins into a feedblock where they are arranged into an "A/B/A" configuration prior to extrusion through a die. The adhesive layers must be compatible with the barrier layer as well as the substrates that are being laminated or coated. Further, the adhesive layers must be at or greater than 600° F. to adequately adhere to the substrates. However, this adhesive layer melt temperature requires that the downstream hardware (such as, for example, the feedblock and/or the die) be at or greater than 600° F. as well. Many barrier materials, including, especially, EVOH, readily degrade when exposed to temperatures greater than about 450° F. for extended periods of time. Due to this degradation, as well as the extensive reaction that may occur between the barrier material and the adhesive layer at the layer interface, the resulting extrudate may have clarity or other problems. For example, EVOH reacts with maleic anhydride, a typical adhesive layer used with EVOH, to produce a "ground glass" appearance when coextruded at high temperatures for extended periods of time.

A known process of coextruding and laminating heat sensitive materials is described in U.S. Pat. Nos. 5,106,562, 5,108,844, 5,190,711 and 5,236,642, which are hereby incorporated by reference in their entirety. Various methods are disclosed for reducing the impact of higher temperature polymeric meltstream elements on a lower temperature polymeric meltstream. The methods may include supercooling the hotter meltstream element below the melting temperature but above the crystallization temperature, exposing one or more meltstream elements to an undesirable thermal condition for a limited period of time, and/or using one or more layers as a heat sink via encapsulation.

Specifically, these patents describe methods of encapsulating one film layer by another material. The '562 and '844 patents specifically relate to PVdC or, preferably, PVdC-MA core materials with ethylene vinyl acetate copolymer ("EVA") or ethylene methyl acrylate copolymer ("EMA") or blend's thereof encapsulating the core material. The encapsulated PVdC or PVdC-MA is, therefore, protected from the high temperatures of the coextrusion process. Generally, the encapsulation method uses an encapsulator having a crosshead mandrel with a central bore to receive a first meltstream element from an extruder. A second polymeric meltstream is fed through a sleeve via an inlet passage into the encapsulator. As the second meltstream enters the encapsulator, it splits and flows around the first meltstream. Consequently, the second meltstream completely surrounds the first meltstream, thereby forming a combined meltstream. The second meltstream forms a continuous layer about the circumference of the first meltstream completely surrounding the first meltstream. Thus, the first and second meltstreams maintain their individual identities while the first meltstream is completely surrounded by and encapsulated within the second meltstream. The combined meltstream may then be fed through a transport pipe to a feedblock for coextrusion with one or more other layers to produce a multilayer film. However, these patents do not disclose other materials that may be utilized as heat sensitive barrier materials besides PVdC or PVdC-MA.

SUMMARY OF THE INVENTION

The present invention includes a cast film structure comprising an inner barrier layer comprised of a blend of a polyamide and ethylene vinyl alcohol copolymer, and an outer layer on each side of the inner barrier layer, the outer layer comprised of a polyamide. The polyamide is present in the blend in an amount of from 15-40%. Preferably, the polyamide of the barrier layer of the cast film structure is nylon 6 present in an amount of from 20-35%. More preferably, the amount is from 25-30%. A preferred product using the barrier film includes the film of the invention having also a ceramic coating on at least one of the outer layers.

Also included as a part of the invention is a method of casting a barrier film, comprising the steps of: plasticizing a blend of a first polyamide and an ethylene vinyl alcohol copolymer in a first extruder to form a barrier layer, plasticizing a second polyamide in a second extruder, encapsulating the blended barrier layer in the second polyamide from the second extruder to form an encapsulated barrier layer, and co-extruding a third polyamide film on each side of the encapsulated barrier layer.

Also included is a method of packaging a product. The method of packaging a product includes the steps of: (a) providing a multi-layered package material comprising: an inner barrier layer comprised of a blend of a polyamide and ethylene vinyl alcohol copolymer, the polyamide present in the blend in an amount of from 15-40%, and an outer layer on each side of the inner barrier layer, the outer layer comprised of a polyamide; (b) sealing a product within the multi-layered package material; and (c) retort processing the package.

A further part of the present invention is a cast film comprising an inner barrier layer comprised of a blend of a polyamide and ethylene vinyl alcohol copolymer, an encapsulation layer on each side of the inner barrier layer, and an outer polyamide layer on each side of the encapsulation layers opposite the inner barrier, the cast film made by the process of: plasticizing a blend of a first polyamide and an ethylene vinyl alcohol copolymer in a first extruder to form a barrier layer; plasticizing a second polyamide in a second extruder; encapsulating the blended barrier layer in the second polyamide from the second extruder to form an encapsulated barrier layer; and co-extruding a third polyamide film on each side of the encapsulated barrier layer.

Additional features and advantages of the present invention are described in, and will be apparent from, the detailed description of the presently preferred embodiments and from the drawings.

DETAILED DESCRIPTION OF THE INVENTION

The films of the present invention act to prevent the passage of gases such as, for example, oxygen and/or water vapor, from one side of the film to the other. The barrier material is encapsulated by one or more layers of a relatively thermally stable material that acts to protect the barrier material from high temperatures and/or long residence times present during coextrusion, lamination or coating that may destroy or otherwise degrade the barrier material. The one or more thermally stable encapsulating layers aid in binding the thermally sensitive barrier layer to outer layers having relatively higher melt and/or extrusion temperatures thereby maintaining optical clarity of the film produced therefrom. In addition, the present invention relates to using an acid terpolymer as an adhesive to bind the thermally sensitive barrier core material to high temperature outer layers while eliminating clarity problems associated with using other adhesives.

More specifically, the present invention relates to a film structure and a method of manufacturing the film structure. The preferred film structure has first adhesive layer of a relatively low melt temperature encapsulating a thermally sensitive barrier layer. Other adhesive layers are extruded at high temperatures relative to the barrier layer and encapsulate or otherwise are coextruded with the first adhesive layer and the barrier layer. The high temperature of the second adhesive layers aid in adhering the other adhesive layers to outer substrate layers. The first adhesive layers may thereby act as both a heat sink to protect the barrier layer from the high temperatures of the coextrusion/lamination process and a tie layer to aid in bonding the thermally sensitive barrier layer to the outer substrate layers. Moreover, the present invention relates to an improved adhesive layer comprising an acid terpolymer for EVOH that may be used in any high temperature coextrusion process.

Figure 1:
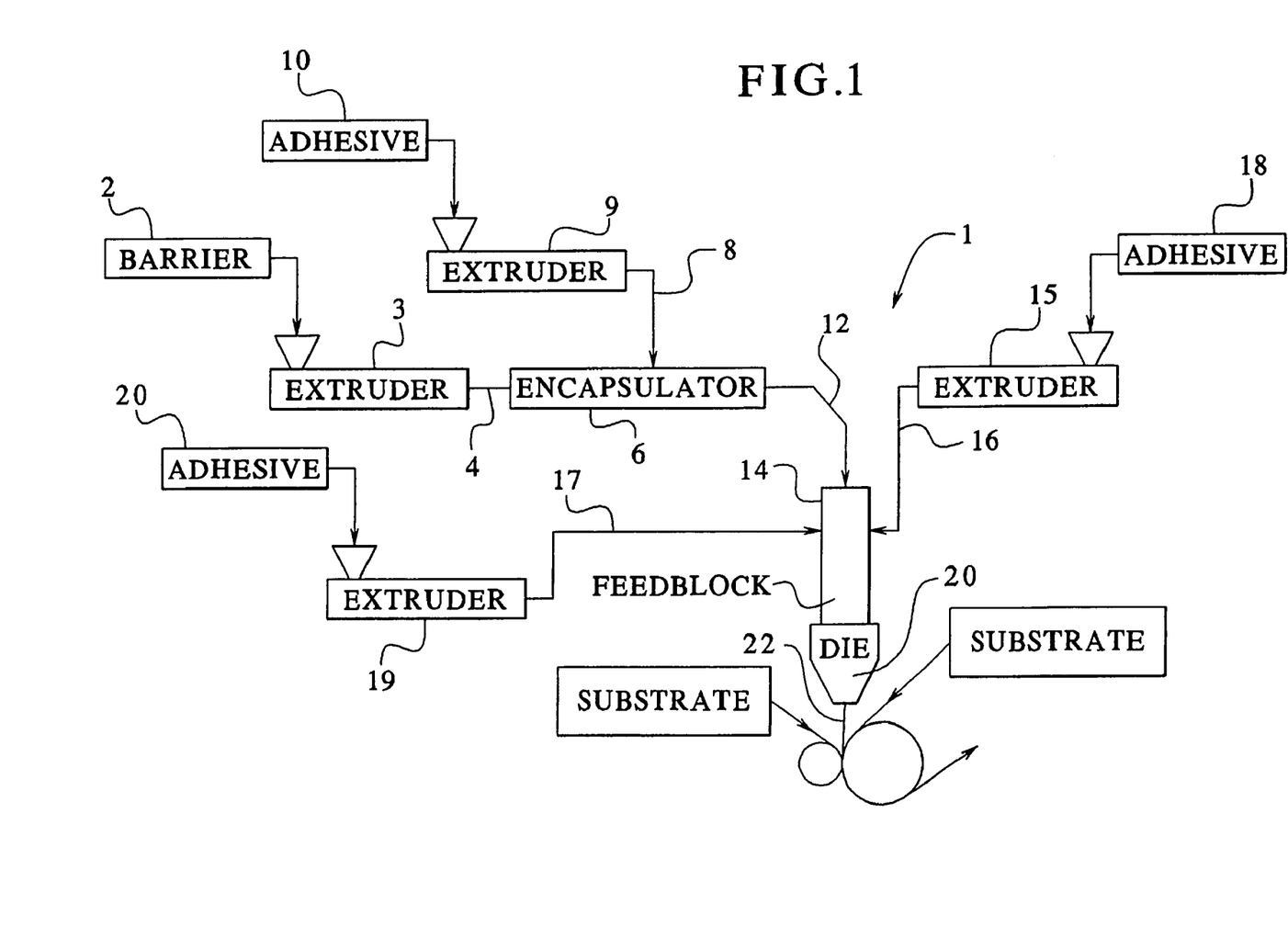
FIG. 1 illustrates an improved-coextrusion lamination process having a plurality of extruders and encapsulators in an embodiment of the present invention.

Referring now to the drawings wherein like numerals refer to like parts, FIG. 1 illustrates an encapsulation system 1. The encapsulation system 1 may include an extruder 3 that may melt and extrude a barrier material 2 into a meltstream 4 using means well known in the art. The barrier material 2 may be melted and extruded at a relatively low temperature so that the barrier material 2 does not degrade within the extruder 3. An adhesive material 10 may be extruded in a second extruder 9 to form an adhesive meltstream 8. The adhesive material 10 may be melted and extruded at a temperature that is the same or relatively similar to the melt temperature of the barrier material 2. The meltstream 4 may then be fed into an encapsulator 6 and encapsulated by the adhesive material 10 via methods described in U.S. Pat. Nos. 5,106,562, 5,108,844, 5,190,711 and 5,236,642, each of which is incorporated in their entirety by reference. By encapsulating the thermally sensitive barrier material 2 (meltstream 4) by the adhesive material (meltstream 8), the barrier material 2 may be protected from high temperatures present within the system 1. Further, the adhesive material 10 (meltstream 8) may aid in reducing the residence time of the barrier material 2 within the downstream coextrusion hardware. The residence time is reduced because the encapsulating adhesive material 10 increases the laminar flow of the barrier material 2 through the hardware. In other words, the barrier material 2 will not get held up on the surfaces of the downstream hardware since the barrier material 2 will not contact the surfaces of the hardware.

An encapsulated meltstream 12 is thereby produced that may then be fed into a feedblock 14. The feedblock 14 may be a Cloeren® feedblock, or any other feedblock apparent to those skilled in the art. At this point, a number of different options are available to create a number of different structures. First, the encapsulated meltstream 12 may be encapsulated by a meltstream 16 from a second adhesive material 18 that is melted and extruded in a third extruder 15. Partial encapsulation may occur if the encapsulating material does not completely surround the encapsulated material. Second, the meltstream 16 and/or a meltstream 17 from a third adhesive material 20 that is melted and extruded in a fourth extruder 19, may be coextruded with the encapsulated meltstream 12 within the feedblock 14. A multilayer-coextruded sheet 22 may be formed after passing the meltstream through a die 21 to thin and spread the material into the flat sheet 22. After the sheet 22 is produced, it may be laminated with outer layers such as various substrates detailed below with reference to FIGS. 2A-2C.

Figure 2A:
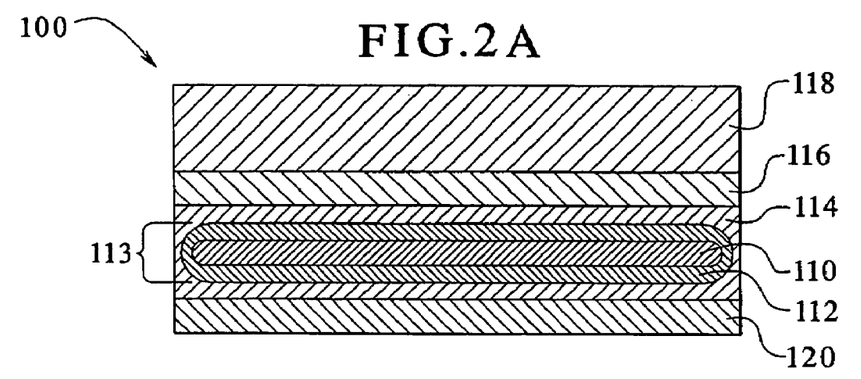
FIG. 2A shows a film structure having a barrier layer encapsulated by first adhesive layers which, in turn, are encapsulated by second adhesive layers, and then laminated outer substrates in an embodiment of the present invention.

FIG. 2A shows an improved structure 100 that may be produced by the system described above with reference to FIG. 1. The structure 100 may include a barrier layer 110 that may be completely encapsulated by first adhesive layers 112. The barrier layer 110 may be composed of any thermoplastic polymeric material that may prevent the migration of molecules such as, for example, oxygen and water vapor, thereby protecting sensitive materials contained within packages made from the structure 100. For example, the structure 100 may be utilized as a bag that may be sealed on all sides and may completely surround an article of food contained therein. The barrier layer 110 may preferably be made from a material having superior barrier properties such as, for example, polymers and/or copolymers of EVOH and EVOH blends of nylon or polyethylene. Moreover, other materials may include polyamide polymers, copolymers and blends thereof; PVdC and PVdC-MA; acrylonitrile polymers and copolymers; and polyethylene copolymers and/or blends.

The barrier layer 110 may be protected by the first adhesive layers 112 that may encapsulate the barrier layer 110 via the system described in FIG. 1. The first adhesive layers 112 may be coextruded to encapsulate the barrier layer 110 to create a first encapsulated extrudate 113 composed of a barrier layer 110 completely surrounded by first adhesive layers 112. The first extrudate 113 may then be coextruded with and/or encapsulated by second adhesive layers 114 at a higher temperature than the first encapsulated extrudate 113. The first adhesive layers 112 may protect the barrier layer 110 from the high temperatures necessary to adequately melt and extrude the second adhesive layers 114 or any other layer coextruded, laminated or otherwise disposed adjacent to the first adhesive layers 112.

Outer layers 116,118, and/or 120 may be laminated to the first extrudate 113 as apparent to those skilled in the art. The outer layers 116,118 and/or 120 may include any substrate necessary to add desired properties to the structure 100. For example, the outer layer 116 may include any material that may add strength, stiffness, heat resistance, durability and/or printability to the structure 100. Further, the layer 116 may act to prevent the migration of certain types of molecules, such as, for example, moisture, from penetrating into the inner layers of the structure 100. Further, the layer 116 may add flex crack resistance to the film structure produced. In addition, the outer layer 120 may be composed of a material that may act as a sealant when heated. However, it should be noted that the outer layers 116,118 and/or 120 may be composed of any material apparent to those skilled in the art for providing desired characteristics to the structure 100.

Figure 2B:
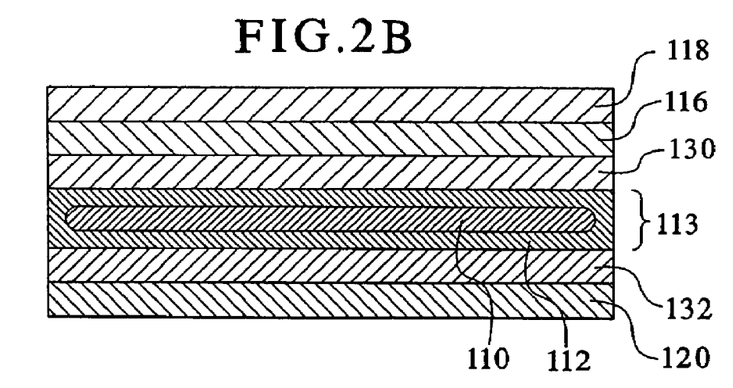
FIG. 2B illustrates a film structure having a barrier layer encapsulated by first adhesive layers and coextruded with second and third adhesive layers. Further, outer substrate layers are then laminated thereto.
Figure 2C:
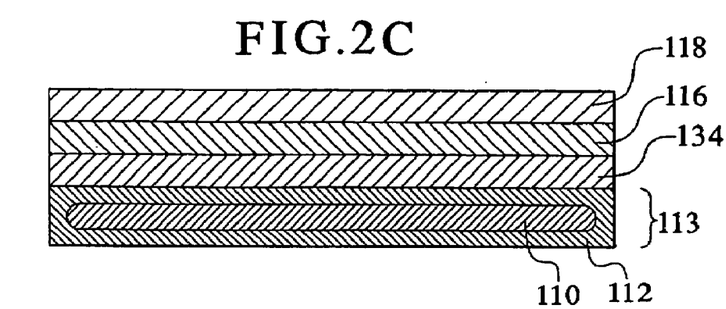
FIG. 2C illustrates an alternate embodiment of the present invention of a barrier layer encapsulated by first adhesive layers and coextruded with a single second adhesive layer on only one side of the barrier layer/first adhesive layer encapsulation.

Alternatively, the first extrudate 113 may be coextruded with one or more layers as shown with reference to FIGS. 2B and 2C, rather than be encapsulated with the adhesive layers 114. Referring now to FIG. 2B, the first extrudate 113 may be coextruded with an adhesive layer 130 on a surface of the first extrudate 113. Another adhesive layer 132 may be coextruded on an opposite surface of the first extrudate 113. The adhesive layers 130,132 may be the same material or, alternatively, may be composed of different materials. The adhesive layers 130,132 may be different depending on the type of material bonded thereto to form the outside layers 116, 118 and/or 120. However, any type of layer may be laminated thereon as may be apparent to those skilled in the art.

Further, the first extrudate 113, including the barrier layer 110 and the first adhesive layers 112, may have an adhesive layer 134 coextruded on only one surface of the first extrudate 113 as shown in FIG. 2C. In addition, there may be no adhesive layer disposed on the opposite surface of the first extrudate 113. Further, the outer layers 116,118 may be laminated to the adhesive layer 134.

Conventional adhesive layers coextruded, laminated or otherwise disposed adjacent to an EVOH barrier layer typically are composed of a resin of polyethylene having maleic anhydride grafted thereon. However, as stated previously, maleic anhydride tends to react with the EVOH copolymer chain causing crosslinkages between the maleic anhydride grafted polyethylene and the EVOH. Many crosslinkages may degrade the quality of the barrier layer properties and may further degrade the optical clarity of the film, causing a wavy "ground glass" appearance.

Therefore, other materials may be utilized in the present invention as adhesive layers to encapsulate, coextrude with, laminate to or otherwise be disposed adjacent to the EVOH barrier material. For example, it has been determined that an acid terpolymer of, preferably, ethylene, acrylic acid and methyl acrylate works well to tie the barrier layer of EVOH to outer layers of the film structure while protecting the EVOH barrier layer from high temperatures and long residence times within the coextrusion hardware. Moreover, acid terpolymer may be used as an adhesive layer for the following barrier layers: EVOH; EVOH/nylon blends; EVOH/polyethylene ("PE") copolymers; polyamides and acrylonitrile. Although acid terpolymer may not bind well with EVOH, this invention allows the EVOH and acid terpolymer to be subject to long residence times in order to adequately adhere to each other.

Further, polyamide, otherwise known as nylon, also may adequately bond EVOH to outer substrate layers. Polyamide adhesive layers may adhere to the following barrier layers at relatively low melt temperatures: EVOH, EVOH/nylon blends, EVOH/PE copolymers and polyamide. Moreover, acid terpolymers and nylon may provide good adhesion to EVOH without causing the optical clarity problems associated with maleic anhydride.

It should also be noted that while acid terpolymer and nylon may be used with encapsulation, as described above, they should not be limited in that regard. Specifically, acid terpolymer and nylon adhesive layers adhering to EVOH may be used in any film-making process apparent to those skilled in the art, including coextrusion and lamination processes.

Moreover, although maleic anhydride grafted to PE may cause clarity problems when used as an adhesive with EVOH, maleic anhydride may still be used, especially when clarity is not an issue. Polyethylene grafted with maleic anhydride functional groups may bond to the following barrier layers: EVOH, EVOH/nylon blends, EVOH/PE copolymers, polyamides and PVdC-MA.

Other adhesive layers that may be utilized to bond to the barrier layer and to tie the barrier layers to outer layers may include a polystyrene block copolymer, preferably for bonding to an acrylonitrile barrier layer. In addition, ethylene acrylic acid copolymer ("EAA") may be used to bond to PVdC-MA or an acrylonitrile barrier layer.

The adhesive layers 114, 130, 132 and/or 134 as shown in FIGS. 2A-2C may aid in bonding the adhesive layers 112 to substrates that may be disposed on outside surfaces of the film structure. Generally, the adhesive layers 114, 130, 132 and/or 134 may be melted and/or coextruded at relatively high temperatures since the adhesive layers 112 protect the barrier layer 110. The fact that EVOH is protected by the adhesive layers 112 allows the use of high temperatures to adequately adhere the adhesive layers 114, 130, 132 and/or 134 to the outer substrate layers.

The adhesive layers 114, 130, 132 and/or 134 may comprise any of the following: acid terpolymer; maleic anhydride grafted to polyethylene; EMA; EVA; or polystyrene block copolymer. Further, EMA may be used to tie the adhesive layers 112 to the following outer layers: oriented polyesters; oriented polypropylene; oriented nylon, metal foil; paper and paper board. Further, EVA may be used as the adhesive layers 114, 130, 132 and/or 134 to bond the adhesive layers 112 to oriented polyesters, metal foil, uniaxially oriented polypropylene or high density polyethylene ("HDPE"), paper and paper board. Finally, polyethylene such as low density polyethylene ("LDPE"), linear low density polyethylene ("LLDPE"), medium density polyethylene ("MDPE") and HDPE may be used as the adhesive layers 114, 130, 132 and/or 134 to tie the adhesive layers 112 to many other types of layers except biaxially oriented polypropylene, uniaxially oriented polypropylene or HDPE.

The barrier layer 110, adhesive layers 112, 114, 130, 132 and/or 134 may be laminated to substrates to form completed film structures. As noted with reference to FIGS. 2A and 2B, the substrates may include the outer layers 116, 118 and/or 120. The substrates may be composed of any of the following materials: oriented polyesters and variations thereof including metallized polyesters; oriented polypropylene and variations thereof including metallized PP; biaxially oriented nylon; metal foil; uniaxially oriented PP or HDPE; paper and paper board; non-oriented nylon or EVOH/nylon blends, including metallized variations thereof; extrusion coated PET/nylon; single site catalyzed ("SSC") polyolefins and ionomers. It should be noted that the list of substrates above is not exhaustive; any polymeric material may be used as a substrate for any purpose as may be apparent to those skilled in the art. The following table lists common substrates with materials commonly used as adhesives. Further, the table lists the melt temperatures necessary to adequately adhere the adhesive materials to the substrates:

| CONDITIONS FOR ADEQUATE ADHESION TO VARIOUS SUBSTRATES | |
|---|---|
| Substrate Type | Adhesive Material (Melt Temperature) |
| PET | PE (610° F.), EMA (610° F.) |
| Oriented Polypropylene | EMA (550° F.) |
| Foil | Acid Copolymer (550° F.), Ionomer (610° F.), PE (610° F.) |
| Paper | EVA (550° F.), PE (550° F.), Ionomer (550° F.) |
| Cellophane | EVA (550° F.), PE (610° F.) |
| PVDC | EVA (550° F.), PE (610° F.) |
| Biaxially oriented nylon | Acid Copolymer (550° F.), Ionomer (610° F.), PE (610° F.) |

Preferred Film Structures

| STRUCTURE 1 | | |
|---|---|---|
| Layer | Components | Melt Temperature |
| Outer Layer 118 | EVA | NA |
| Outer Layer 116 | oriented polypropylene | NA |
| Adhesive 114, 130 | EMA, PE or other PE copolymers | 550-610° F. |
| Adhesive 112 | acid terpolymer or maleic anhydride grafted to PE | 400-450° F. |
| Barrier 110 | EVOH or EVOH blend | 400-450° F. |
| Adhesive 112 | acid terpolymer or maleic anhydride grafted to PE | 400-450° F. |
| Adhesive 114, 132 | EMA, PE or other PE copolymers | ~610° F. |
| Outer Layer 120 | Polyester | NA |

As shown in Structure 1 and corresponding to the film structure shown in FIG. 2A or 2B, EVOH or an EVOH blend (>75% EVOH) may be used as the barrier layer 110 with acid terpolymer or maleic anhydride grafted to PE as the adhesive layers 112 encapsulating the EVOH barrier layer 110. In a preferred embodiment, the EVOH barrier layer may be encapsulated by acid terpolymer forming the first extrudate 113 at a first temperature that is relatively low since both the EVOH and acid terpolymer will extrude within the same temperature range of 400° F. and 450° F., preferably 410° F. Next, PE copolymers or blends thereof may be coextruded with the first extrudate 113 of EVOH and acid terpolymer or maleic anhydride to make a film structure corresponding to the film structure of FIG. 2B. Alternatively, the first extrudate 113 may be fed through a second encapsulator thereby encapsulating the first extrudate by the PE copolymer such as, for example, EMA, thereby making a film structure corresponding to the film structure of FIG. 2A.

Preferably, the adhesive layers 114, 130 are EMA. To adequately adhere the EMA to the oriented polypropylene layer, as shown in Structure 1, the EMA should be extruded at a temperature of about 550° F. Moreover, the adhesive layers 114, 132 bonded to the outer layer 120 of PET should be extruded at a temperature of about 610° F. to adequately adhere to the PET. As previously noted, the adhesive layers 112 protect the EVOH barrier layer from the high temperatures or long residence times of the encapsulation or coextrusion of the adhesive layers 114, 130 and/or 132.

| STRUCTURE 2 | | |
|---|---|---|
| Layer | Components | Melt Temperature |
| Outer Layer 118 | EVA | NA |
| Outer Layer 116 | OPP or biaxially oriented nylon | NA |
| Adhesive 114, 130 | LDPE, EMA or other PE copolymers (with or without maleic anhydride functionality) | 550-610° F. |
| Adhesive 112 | Nylon | 440-470° F. |
| Barrier 110 | EVOH or EVOH blend | 400-450° F. |
| Adhesive 112 | Nylon | 440-470° F. |
| Adhesive 114, 132 | LDPE, EMA or other PE copolymers (with or without maleic anhydride functionality) | ~610° F. |
| Outer Layer 120 | PET or other | NA |

As shown in Structure 2 and corresponding to the film structure shown in FIG. 2A or 2B, EVOH or an EVOH blend (>75% EVOH) may be used as the barrier layer 110 with nylon as the adhesive layers 112 encapsulating the EVOH barrier layer 110. The EVOH barrier layer may be extruded within a temperature range of 400° F. and 450° F., preferably 410° F. and may be encapsulated by nylon that may be extruded within the temperature range of 440° F. and 470° F., preferably 450° F. Next, the adhesive layers 114, 130 and/or 132 comprising a layer of LDPE or EMA may encapsulate or otherwise be coextruded with the first extrudate 113 of EVOH and nylon to make a film structure corresponding to the film structure of FIG. 2A or 2B. To adequately adhere the LDPE or EMA to the oriented polypropylene layer, as shown in Structure 2, the LDPE or EMA should be extruded at a temperature of about 550° F. Moreover, the adhesive layers 114, 132 comprising LDPE or EMA bonded to the outer layer 120 of PET should be extruded at a temperature of about 610° F. to adequately adhere to the PET. As previously noted, the adhesive layers 112 protect the EVOH barrier layer from the high temperatures or long residence times of the encapsulation or coextrusion of the adhesive layers 114, 130 and/or 132.

STRUCTURE 3

| Layer | Components | Melt Temperature |
|---|---|---|
| Outer Layer 118 | EVA or other | NA |
| Adhesive 114, 130 | LDPE | 580-620° F. |
| Adhesive 112 | Acid Terpolymer | 400-450° F. |
| Barrier 110 | EVOH | 400-450° F. |
| Adhesive 112 | Acid Terpolymer | 400-450° F. |
| Adhesive 114, 132 | LDPE | ~610° F. |
| Outer Layer 120 | PET or other | NA |

Structure 3 may correspond to the film structure of FIG. 2B, except without the outer layer 116. In other words, Structure 3 may have a barrier layer 110 of EVOH encapsulated by the adhesive layers 112 comprising, preferably, acid terpolymer. Again, the EVOH and the acid terpolymer may be extruded between 400° F. and 450° F. Adhesive layers 114, 130 and/or 132 may encapsulate or otherwise be coextruded with the first extrudate 113 comprising EVOH and acid terpolymer. The adhesive layers 114, 130 bonding to outer layer 118 comprising EVA may be extruded at a temperature between 580° F. and 620° F. The adhesive layers 114, 132 that bond to the outer layer 120 comprising PET may be extruded at a temperature of about 610° F. The elimination of the OPP layers allows for the use of LDPE as the adhesive layer 114 or 130.

STRUCTURE 4

| Layer | Components | Melt Temperature |
|---|---|---|
| Outer Layer 118 | EVA or other | NA |
| Outer Layer 116 | OPP or biaxially oriented nylon | NA |
| Adhesive 114, 130 | PE with grafted maleic anhydride | 580-620° F. |
| Adhesive 112 | Nylon | 440-470° F. |
| Barrier 110 | EVOH or EVOH/nylon blend | 400-450° F. |
| Adhesive 112 | Nylon | 440-470° F. |
| Adhesive 114, 132 | PE with grafted maleic anhydride | ~610° F. |
| Outer Layer 120 | PET or biaxially oriented nylon | NA |

Structure 4 illustrates another preferred embodiment of the present invention. In this embodiment, the barrier layer 110 may be EVOH or EVOH blended with nylon having adhesive 112 comprising nylon encapsulating the barrier layer 110. Again, the barrier layer 110 and the first adhesive layers 112 may be extruded and encapsulated at roughly the same temperature to protect the barrier layer from degradation caused by heat or long residence times. Further, the adhesive layers 114, 130 and/or 132 may comprise polyethylene blended with polyethylene having maleic anhydride functional groups grafted thereto and may encapsulate the barrier layer and the first adhesive layers or may otherwise be coextruded therewith. The adhesive layers 114, 130 and/or 132 may be extruded at a relatively high temperature compared to the barrier layer and the adhesive layers 112: about 580° F. to about 620° F. The outer layer 116 may comprise an oriented polypropylene layer or a layer of nylon disposed between the adhesive layer 114 or 130 and the outer layer 118 may comprise a sealant layer of EVA or other material. Further, the outer layer 120 may be PET or biaxially oriented nylon. Another embodiment may have no outer layer 116 disposed between the adhesive 114 or 130 and the outer layer 118.

In still yet another aspect of the present invention, a barrier layer is formed from a blend of an EVOH copolymer and a polyamide, particularly a blend comprised of from 15-40% nylon and balance EVOH (and preferably at least 20% nylon and balance EVOH). Such a barrier material can be cast extruded to form a film structure having a polyamide/EVOH barrier layer surrounded by polyamide layers on each side. Preferably, the barrier layer is encapsulated within nylon, which encapsulation layer is then preferably coextruded with nylon on each side. The outer nylon layers may be, but do not necessarily have to be, the same nylon as is blended with the EVOH in the barrier layer, or which encapsulates the barrier layer.

Figure 3:
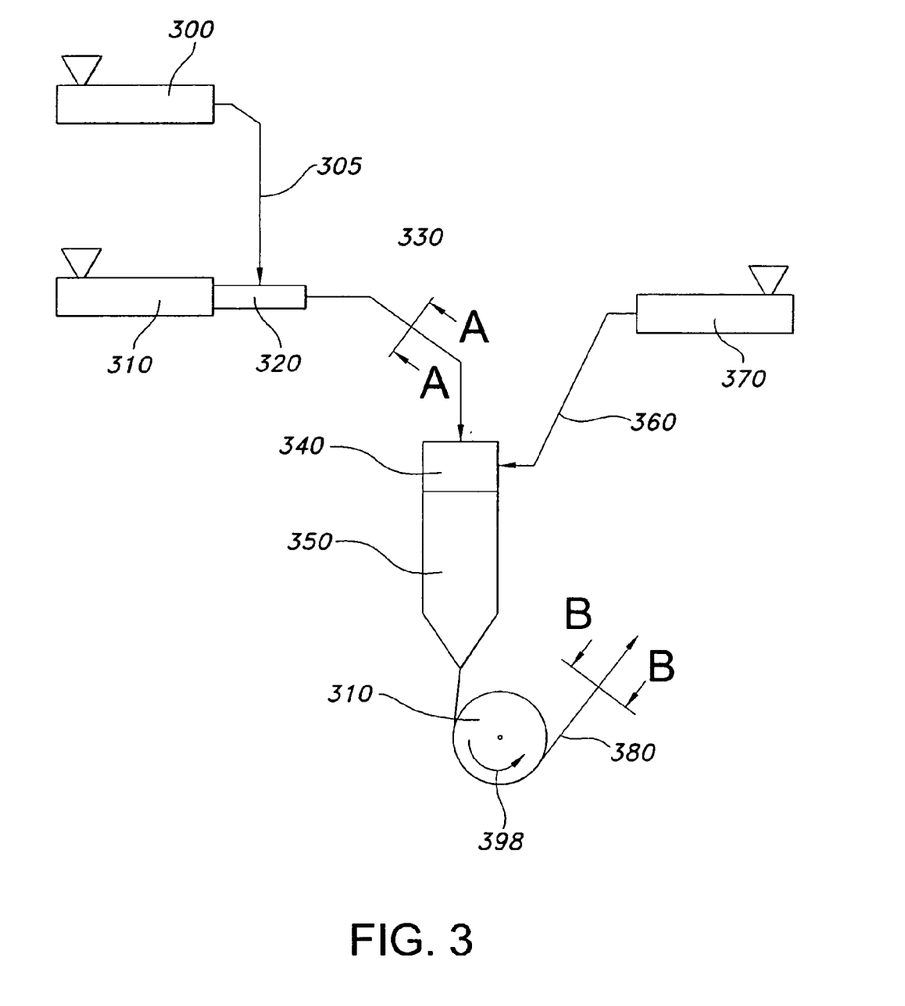
FIG. 3 illustrates schematically an apparatus used to produce a film in accordance with one aspect of the present invention.
Figure 3A:
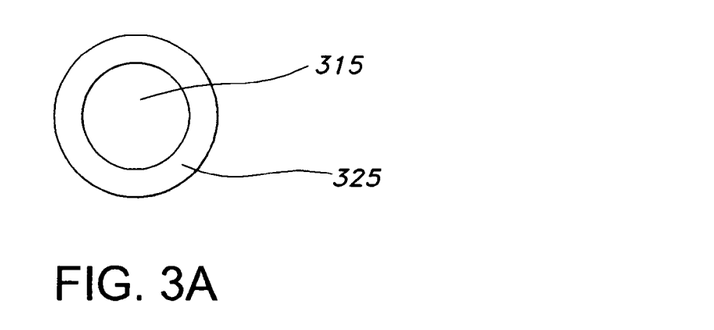
FIG. 3A illustrates a cross sectional view of the extrudate stream leaving the encapsulator shown in FIG. 3.
Figure 3B:
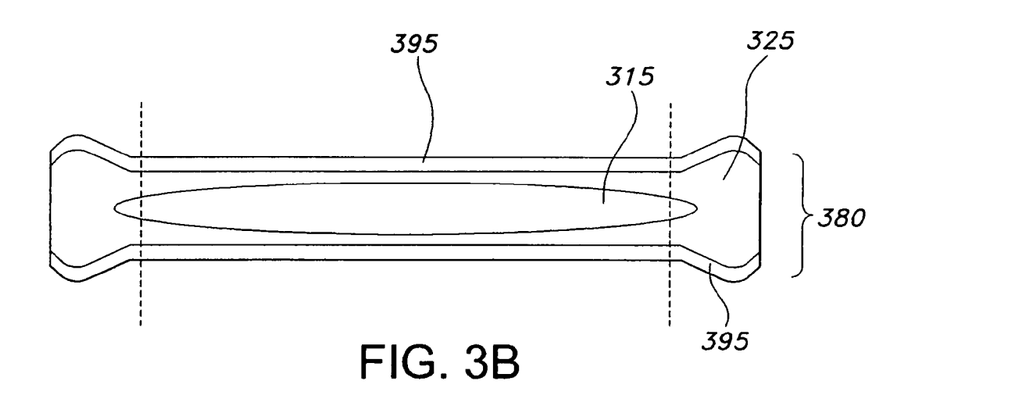
FIG. 3B illustrates a cross sectional view of the cast film coming off the chill roll shown in FIG. 3.
Figure 4:
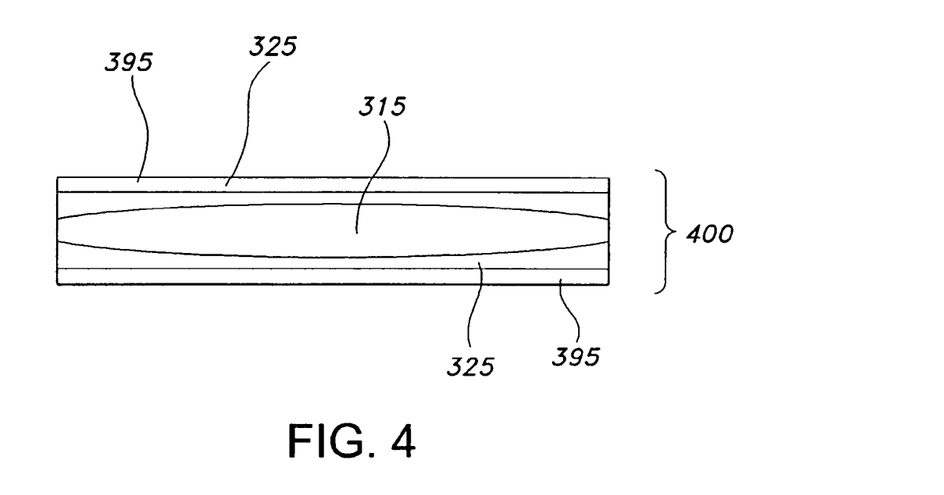
FIG. 4 illustrates a cross sectional view of the cast film of FIG. 3B after its edges have been trimmed.

FIG. 3 schematically shows a cast extrusion apparatus in which a polyamide, preferably nylon 6, is fed to extruder 300 and caused to flow through conduit 305 to encapsulator 320. The extrudate from extruder 310, which is an EVOH/nylon blend in accordance with the invention, is also fed to encapsulator 320. Within encapsulator 320, the extruded EVOH/nylon blend is encapsulated within the extruded nylon from extruder 300. Cross section A-A is shown in FIG. 3A, with inner layer 315 comprised of the EVOH/nylon blend from extruder 310 which is encapsulated within nylon layer 325 from extruder 300. The encapsulation layer leaving encapsulator 320 is then passed, via conduit 330, to feedblock 340 and die 350. In this embodiment, feedblock 340 also receives a nylon extrudate stream via conduit 360 from extruder 370 to form outer nylon layers 395 around the nylon layer 325. Leaving die 350, then, is molten multilayer film 380 (a cross section of which is shown in FIG. 3B and discussed below) which passes onto chill roll 390, which chill roll is rotating in the direction of arrow 398. As the film comes off of the chill roll, it has its edges trimmed. FIG. 4 shows a cross sectional view of the product resulting from the trimming of film 380 at its edges. The somewhat flared edges of the film as shown in FIG. 3B are known as an edge bead. It is these edges that are trimmed as described below.

As a part of the process depicted schematically in FIG. 3 and discussed above, the resin materials are preferably plasticized. This plasticizing can occur by any of a number of means known to those skilled in the art, including epoxidizing the resin with soybean or linseed oil, or any other plasticizers known to those skilled in the art.

As noted above, FIG. 4 shows an exemplary cross section of a five-layered film made in accordance with this aspect of the present invention as described with respect to FIG. 3. Specifically, barrier film 400 is comprised of an EVOH/nylon blend (layer 315), which is encapsulated by nylon layers 325, which is in turn layered with outer nylon layers 395.

Note that the scrap trimmed from the edges of that shown in FIG. 3B is comprised only of nylon and EVOH. This aspect of the present invention is important because, as discussed in more detail below, this trim scrap can be easily recycled back to extruder 310 to become part of barrier layer 315.

A more preferred barrier layer 315 is comprised of from 20-35% nylon, and a most preferred blend is comprised of from 25-30% nylon and balance EVOH. It has been found that this blend is particularly well suited for retort packaging using the films of the present invention. A preferred blend uses nylon 6 homopolymer and an EVOH with an ethylene mole percentage from 24% -44%, more preferably from 27% -38%, and most preferably at about 32%. It should be noted, however, that the barrier film is not limited to using nylon 6; a polyamide material other than nylon 6 homopolymer could be used. Moreover, each of the polyamide layers or blends could be comprised of the same, or different, polyamides.

Several advantages (some of which are unexpected) are realized when barrier film 400 is comprised as noted above. One advantage is that the resultant film will withstand the retort process and maintain clarity. Another advantage is that the oxygen barrier property of this film improves after the film is subjected to the retort cycle. Because EVOH, by itself, will not survive the retort process, the expectation was that the blend would be slightly worse after retort (as compared to the barrier properties prior to retort). Instead, and unexpectedly, the oxygen barrier performance actually improved after retort.

Another advantage is seen in the EVOH/nylon layer that is encapsulated by the nylon. This encapsulation is seen to prevent gel formation within the barrier layer due to nylon-EVOH crosslinking that would otherwise occur as that layer is extruded. When the nylon layer is coextruded around the barrier layer (thus encapsulating it within the encapsulator), this crosslinking between the nylon and EVOH within the barrier layer, and thus gel-formation, is prevented. Relatedly, the miscibility of the nylon and EVOH is relatively high and therefore the barrier film is very clear and the adhesion between the encapsulating nylon layers and the EVOH/nylon barrier layer is essentially inseparable.

Still yet another advantage is realized when the barrier material is a blend of nylon and EVOH as noted above. Specifically, when the encapsulating layer is nylon and the barrier material is an EVOH/nylon blend defined as above, the edge trim is thus also an EVOH/nylon blend (albeit with a higher nylon content than the barrier layer itself as extruded from extruder 310). This trim, which would otherwise be discarded in casting processes of the prior art (where the combined layers trimmed away are made up of combinations of materials that are not reusable), can be recycled back to the barrier material extruder without affecting clarity or layer adhesion. Such recycle is significant because the trimming of a film edge during casting can typically waste 15-20% of the material from the product roll.

Another advantage is that the oxygen barrier property of this film actually improves after the film is subjected to the retort cycle. Depending upon the particular blend ratio and type of nylon used for barrier film 400 and the final structure of the film, the post-retort oxygen barrier improvement (over pre-retort oxygen barrier performance), ranges from 10-50%. In addition, the barrier in accordance with this blend does not deteriorate when the package is flexed.

The EVOH/nylon blend barrier film 400 as noted above may also be joined (or laminated) with, or coated by, other materials. One such structure is an adhesive lamination of the barrier film, encapsulated by nylon, to a polypropylene based sealant on one side and an oriented polyethylene terephthalate on the other. Other final structures can be variations of this, however, and would include substituting oriented nylon for the PET or moving the EVOH/nylon blend barrier film to the outside of the structure. In addition, the final structure could also have a layer of foil in the lamination, the purpose being duel oxygen protection in case of any cracking of the foil. This later case would be desired only when foil is desired for some reason other than the prevention of oxygen influx. As noted above, the oxygen barrier properties of the barrier material disclosed is excellent.

Another combination would include coating the barrier film 400 with an aluminum oxide ($AlO_x$) or silicon oxide ($SiO_x$) layer. Such glass coatings would include a film such as Ceramis® (Ceramis is a registered trademark of Lawson Mardon Neher Ltd. for plastic films, plastic film laminates and plastic laminates containing surfaces and/or intermediate layers of ceramic and/or oxide materials for use in the manufacture of packaging materials). These oxide coatings, however, although exhibiting good oxygen barrier properties, have demonstrated a lack of flexibility which often led to cracking and the resultant (and very undesirable) loss of oxygen barrier performance. With the flexibility and crack resistance of the barrier film 400 described herein, however, cracking of the oxide or ceramic layer does not result in a substantial loss of oxygen barrier performance.

In addition to the coatings described above, metallized coatings could also be used, either instead of the glass coatings, or in addition to the glass coatings. Preferably the metallized coatings would be used in place of the glass coatings where clarity is not a required characteristic of the final film, because the metailized coatings are not transparent as are the glass coatings. Typical metallized coatings are known and include metallized oriented polyester layers and the like that form good moisture and oxygen barriers.

It should also be noted that varying the relative proportions of nylon and EVOH within the barrier layer, which is easily done (especially with the controlled recycle of trim material, the compositional of which is known), can yield barrier films of precise characteristics making the processing of this material very controllable and economical.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A cast film comprising:
    an inner barrier layer comprised of a blend of a polyamide and ethylene vinyl alcohol copolymer, the polyamide present in said blend in an amount of from 15-40%;
    an encapsulation layer on each side of said inner barrier layer, said encapsulation layers comprised of a polyamide; and an outer polyamide layer on each side of said encapsulation layers opposite said inner barrier.

2. The cast film of claim 1 wherein the polyamide in said inner barrier blend is nylon 6.

3. The cast film of claim 1 wherein the polyamide in said inner barrier blend is present in an amount of from 20-35%.

4. The cast film of claim 1 wherein the polyamide in said inner barrier blend is present in an amount of from 25-30%.

5. The cast film of claim 1 further comprising a sealant layer laminated to at least one of said outer polyamide layers opposite said encapsulation layer.

6. The cast film of claim 5 wherein said sealant layer is polypropylene.

7. The cast film of claim 1 further comprising a polyethylene terepthalate layer laminated to at least one of said outer polyamide layers opposite said encapsulation layer.

8. The cast film of claim 1 further comprising a ceramic coating on at least one of said outer polyamide layers opposite said encapsulation layer.

9. The cast film of claim 1 further comprising an oxide coating on at least one of said outer polyamide layers opposite said encapsulation layer.

10. The cast film of claim 1 further comprising a silicon oxide coating on at least one of said outer polyamide layers opposite said encapsulation layer.

11. The cast film of claim 1 further comprising an aluminum oxide coating on at least one of said outer polyamide layers opposite said encapsulation layer.

12. The cast film of claim 1 further comprising a metallized coating on at least one of said outer polyamide layers opposite said encapsulation layer.

13. A method of casting a barrier film, said method comprising the steps of:
   plasticizing a blend of a first polyamide and an ethylene vinyl alcohol copolymer in a first extruder to form a barrier layer;
   plasticizing a second polyamide in a second extruder;
   encapsulating said blended barrier layer in said second polyamide from said second extruder to form an encapsulated barrier layer; and
   co-extruding a third polyamide layer on at least one side of said encapsulated barrier layer.

14. The method of claim 13 wherein said first polyamide is nylon 6.

15. The method of claim 13 wherein said first polyamide is present in an amount of from 20-35% of said blend.

16. The method of claim 13 wherein said first polyamide is present in an amount of from 25-30% of said blend.

17. The method of claim 13 further comprising the step of applying a sealant layer to said third polyamide layer.

18. The method of claim 13 further comprising the step of applying a ceramic coating to said third polyamide layer.

19. The method of claim 13 further comprising the step of applying an oxide coating to said third polyamide layer.

20. The method of claim 19 wherein the oxide coating is a silicon oxide.

21. The method of claim 19 wherein the oxide coating is an aluminum oxide.

22. The method of claim 13 further comprising the step of applying a metallized coating to said third polyamide layer.

23. The method of claim 13 further comprising the step of trimming an edge of the cast barrier film formed by co-extruding the third polyamide layer on at least one side of the encapsulated barrier layer, and recycling the trimmed edge into the blend of the first polyamide and the ethylene vinyl alcohol copolymer in the first extruder.

24. A method of casting a barrier film, said method comprising the steps of:
   plasticizing a blend of a first polyamide and an ethylene vinyl alcohol copolymer;
   coextruding said blend in a first extruder to form a barrier layer;
   plasticizing a second polyamide;
   extruding said plasticized second polyamide in a second extruder;
   encapsulating said blended barrier layer in said plasticized second polyamide to form an encapsulated barrier layer; and
   co-extruding a third polyamide layer on at least one side of said encapsulated barrier layer.

25. The method of claim 24 wherein said first polyamide is nylon 6.

26. The method of claim 24 wherein said first polyamide is present in an amount of from 20-35% of said blend.

27. The method of claim 24 wherein said first polyamide is present in an amount of from 25-30% of said blend.

28. The method of claim 24 further comprising the step of applying a sealant layer to said third polyamide layer.

29. The method of claim 24 further comprising the step of applying a ceramic coating to said third polyamide layer.

30. The method of claim 24 further comprising the step of applying an oxide coating to said third polyamide layer.

31. The method of claim 30 wherein the oxide coating is a silicon oxide.

32. The method of claim 30 wherein the oxide coating is an aluminum oxide.

33. The method of claim 24 further comprising the step of applying a metallized coating to said third polyamide layer.

34. A method of packaging a product, the method comprising the steps of:
   (a) providing a multi-layered package material comprising:
      an inner barrier layer comprised of a blend of a polyamide and ethylene vinyl alcohol copolymer, the polyamide present in said blend in an amount of from 15-40%, an outer polyamide layer on each side of the inner barrier layer; and
      a second outer polyamide layer on at least one of said outer polyamide layers,
   (b) sealing a product within the multi-layered package material; and
   (c) retort processing the package.

35. The method of claim 34 wherein the polyamide in the inner barrier blend is nylon 6.

36. The method of claim 34 wherein the polyamide in the inner barrier blend is present in an amount of from 20-35%.

37. The method of claim 34 wherein the polyamide in the inner barrier blend is present in an amount of from 25-30%.

38. The method of claim 34 wherein step (a) includes the step of applying a sealant layer to at least one of said outer polyamide layers.

39. The method of claim 34 wherein step (a) includes the step of applying a ceramic coating on at least one of said outer polyamide layers.

40. The method of claim 34 wherein step (a) includes the step of applying an oxide coating on at least one of said outer polyamide layers.

41. The method of claim 40 wherein the oxide coating is a silicon oxide.

42. The method of claim 40 wherein the oxide coating is an aluminum oxide.

43. The method of claim 34 wherein step (a) includes the step of applying a metallized coating on at least one of said outer polyamide layers.

44. A cast film comprising an inner barrier layer comprised of a blend of a polyamide and ethylene vinyl alcohol copolymer, an encapsulation layer on each side of the inner barrier layer, and an outer polyamide layer on each side of the encapsulation layers opposite the inner barrier, the cast film made by the process of:
plasticizing a blend of a first polyamide and an ethylene vinyl alcohol copolymer in a first extruder to form a barrier layer;
plasticizing a second polyamide in a second extruder;
encapsulating said blended barrier layer in said second polyamide from said second extruder to form an encapsulated barrier layer; and
co-extruding a third polyamide layer on at least one side of said encapsulated barrier layer.

45. The cast film of claim 44 wherein said first polyamide is nylon 6.

46. The cast film of claim 44 wherein said first polyamide is present in an amount of from 20-35% of said blend.

47. The cast film of claim 44 wherein said first polyamide is present in an amount of from 25-30% of said blend.

48. The cast film of claim 44 wherein the process further comprises applying a sealant layer to at least one of said third polyamide layer.

49. The cast film of claim 44 wherein the process further comprises applying a ceramic coating to at least one of said third polyamide layer.

50. The cast film of claim 44 wherein the process further comprises applying an oxide coating to at least one of said third polyamide layer.

51. The cast film of claim 50 wherein the oxide coating is a silicon oxide.

52. The cast film of claim 50 wherein the oxide coating is an aluminum oxide.

53. The cast film of claim 44 wherein the process further comprises applying a metallized coating to at least one of said third polyamide layer.

54. A cast film comprising:
an inner barrier layer comprising ethylene vinyl alcohol copolymer;
an encapsulation layer on each side of said inner barrier layer, said encapsulation layers comprised of a polyamide;
an outer polyamide layer on each side of said encapsulation layers opposite said inner barrier; and
an oxide coating on at least one of said outer polyamide layers opposite said encapsulation layer.

55. The cast film of claim 54 further comprising a sealant layer laminated to at least one of said outer polyamide layers opposite said encapsulation layer.

56. The cast film of claim 55 wherein said sealant layer is polypropylene.

57. The cast film of claim 54 further comprising a polyethylene terepthalate layer laminated to at least one of said outer polyamide layers opposite said encapsulation layer.

58. The cast film of claim 54 further comprising a ceramic coating on at least one of said outer polyamide layers opposite said encapsulation layer.

59. The cast film of claim 54 wherein the oxide coating is comprised of a silicon oxide coating.

60. The cast film of claim 54 wherein the oxide coating is comprised of an aluminum oxide coating.

61. The cast film of claim 54 further comprising a metallized coating on at least one of said outer polyamide layers opposite said encapsulation layer.

62. A method of casting a barrier film, said method comprising the steps of:
plasticizing a first polyamide and an ethylene vinyl alcohol copolymer in a first extruder to form an inner barrier layer;
plasticizing a second polyamide in a second extruder;
encapsulating said inner barrier layer in said second polyamide from said second extruder to form an encapsulation layer;
co-extruding a third polyamide layer on at least one side of said encapsulated barrier layer; and
applying an oxide coating to said third polyamide layer.

63. The method of claim 62 further comprising the step of applying a sealant layer to said third polyamide layer.

64. The method of claim 62 further comprising the step of applying a ceramic coating to said third polyamide layer.

65. The method of claim 62 wherein the oxide coating is a silicon oxide.

66. The method of claim 62 wherein the oxide coating is an aluminum oxide.

67. The method of claim 62 further comprising the step of applying a metallized coating said third polyamide layer.

68. The method of claim 62 further comprising the step of trimming an edge of the cast barrier film formed by co-extruding the third polyamide layer on at least one side of the encapsulated barrier layer, and recycling the trimmed edge into the blend of the first polyamide and the ethylene vinyl alcohol copolymer in the first extruder.

* * * * *